US009582887B2

(12) United States Patent
Atif et al.

(10) Patent No.: US 9,582,887 B2
(45) Date of Patent: Feb. 28, 2017

(54) METHODS AND APPARATUS FOR DETERMINING FIELD OF VIEW DEPENDENT DEPTH MAP CORRECTION VALUES

(71) Applicant: SONY CORPORATION, Tokyo (JP)

(72) Inventors: Muhammad Atif, Stuttgart (DE); Muhammad Siddiqui, Boeblingen (DE)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 14/487,657

(22) Filed: Sep. 16, 2014

(65) Prior Publication Data

US 2015/0098644 A1 Apr. 9, 2015

(30) Foreign Application Priority Data

Oct. 9, 2013 (EP) .................................... 13187969

(51) Int. Cl.
*G06K 9/00* (2006.01)
*G06T 7/00* (2006.01)
*G06T 5/00* (2006.01)

(52) U.S. Cl.
CPC ............ *G06T 7/0051* (2013.01); *G06T 5/001* (2013.01); *G06T 2207/10028* (2013.01)

(58) Field of Classification Search
CPC ................... G06T 7/0051; G06T 5/001; G06T 2207/10028
USPC ......................................................... 382/154
See application file for complete search history.

(56) References Cited

U.S. PATENT DOCUMENTS

2013/0142386 A1 6/2013 Li et al.

FOREIGN PATENT DOCUMENTS

WO WO 2012175731 A1 12/2012
WO WO 2013/069292 A1 5/2013

OTHER PUBLICATIONS

Blahusch, G., W. Eckstein, and C. Steger. "Calibration of curvature of field for depth from focus." International Archives of Photogrammetry Remote Sensing and Spatial Information Sciences 34.3/W8 (2003): 173-180.*
G. Blahusch, et al., "Calibration of Curvature of Field for Depth From Focus", ISPRS Archives, vol. XXXIV, Part 3/W8, Munich, Sep. 17-19, 2003, 5 pages.

* cited by examiner

*Primary Examiner* — Andrew Moyer
(74) *Attorney, Agent, or Firm* — Oblon, McClelland, Maier & Neustadt, L.L.P.

(57) ABSTRACT

In a method for determining field of view dependent depth map correction values for correction of a depth map of an image taken with a lens having a field of view the following is performed:
obtaining (31) relative depth information for at least two different depths and at least two different predetermined locations of the field of view of the lens;
receiving (32) an image;
determining (33) a depth of the received image; and
determining (34) on the basis of the determined depth of the received image at least one depth map correction value on the basis of the relative depth information.

20 Claims, 7 Drawing Sheets

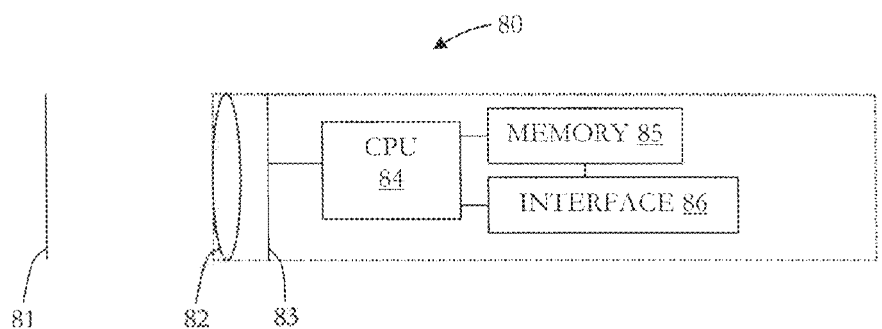
Fig. 8
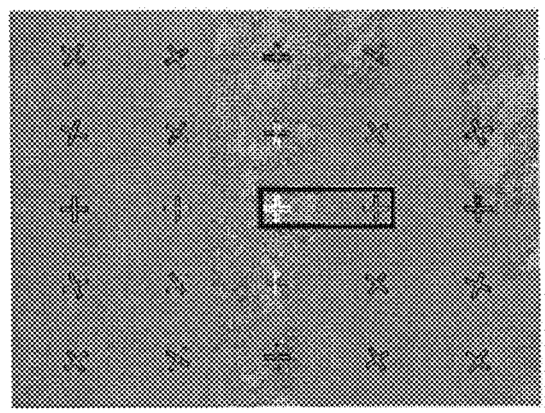
Fig. 9a
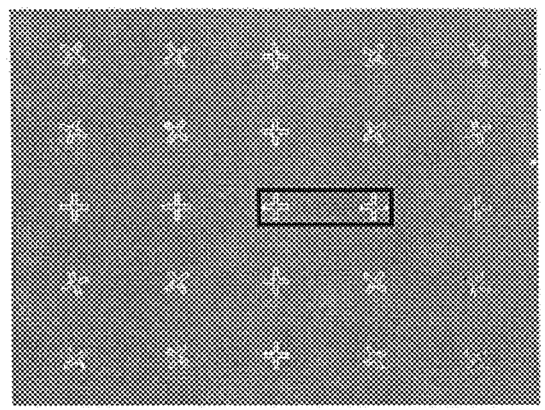
Fig. 9b
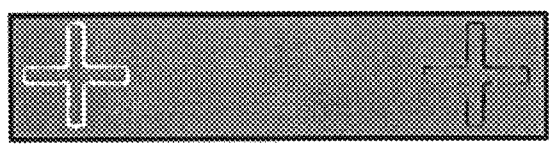
Fig. 9c
Fig. 9d

METHODS AND APPARATUS FOR DETERMINING FIELD OF VIEW DEPENDENT DEPTH MAP CORRECTION VALUES

TECHNICAL FIELD

The present disclosure generally pertains to methods and apparatus for determining field of view dependent depth map correction values.

TECHNICAL BACKGROUND

Generally it is known to perform a depth measurement of an image with the so called depth from focus method or other known methods. Such depth measurements are used, for example, for gesture detection for user interfaces, extended depth field systems or the like.

Although there exist techniques for determining depth from images, it is generally desirable to improve the depth determination.

SUMMARY

According to a first aspect, the disclosure provides a method for determining field of view dependent depth map correction values for correction of a depth map of an image taken with a lens having a field of view, wherein the method comprises obtaining relative depth information for at least two different depths and at least two different predetermined locations of the field of view of the lens; receiving an image; determining a depth of the received image; determining on the basis of the determined depth of the received image at least one depth map correction value on the basis of the relative depth information.

According to a second aspect the disclosure provides an apparatus for determining field of view dependent depth map correction values for correction of a depth map of an image taken with a lens having a field of view, wherein the apparatus comprises a lens; an image sensor for generating an image of an object in a predetermined distance from the lens; and a processor configured to: obtain relative depth information for at least two different depths and at least two different predetermined locations of the field of view of the lens; receive an image from the image sensor; determine a depth of the received image; and determine on the basis of the determined depth of the received image at least one depth map correction value on the basis of the relative depth information.

Further aspects are set forth in the dependent claims, the following description and the drawings.

BRIEF DESCRIPTION OF THE DRAWINGS

Embodiments are explained by way of example with respect to the accompanying drawings, in which:

FIG. 8 illustrates an apparatus of the disclosure;

FIGS. 9*a* and 9*c* illustrate an uncorrected depth map; and

FIGS. 9*b* and 9*d* illustrate a corrected depth map.

DETAILED DESCRIPTION OF EMBODIMENTS

Figure 4:
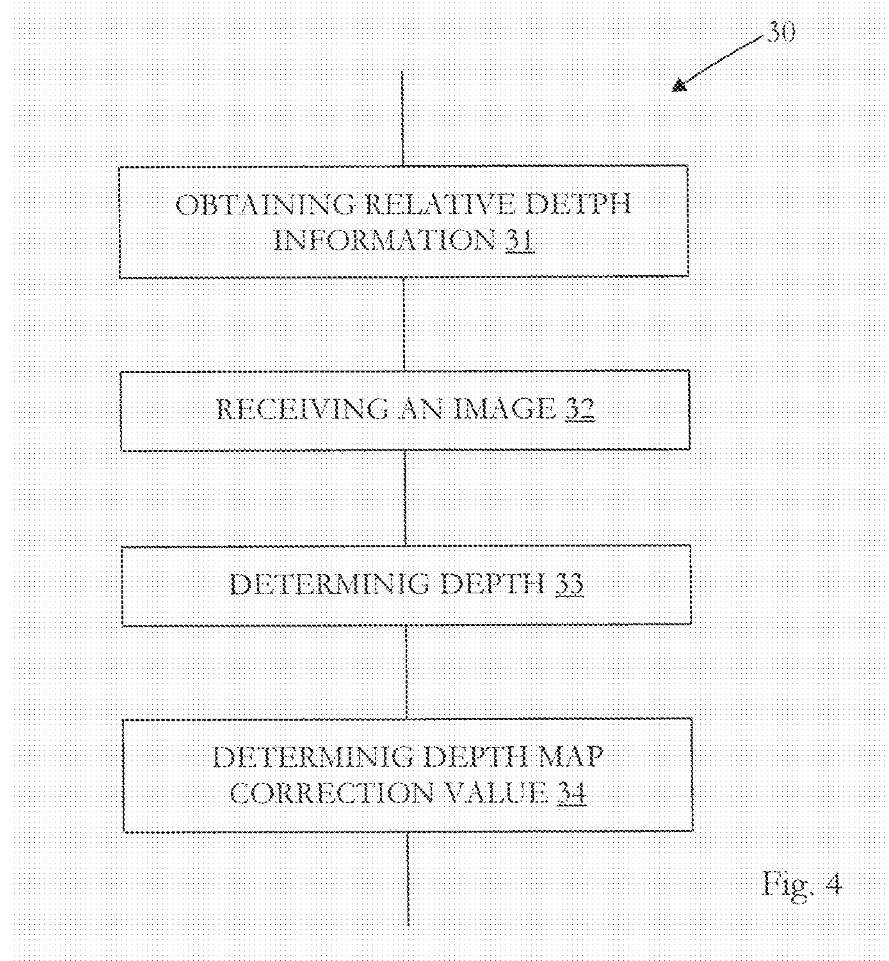
FIG. 4 is a flow chart of a method of the disclosure.

Before a detailed description of the embodiments under reference of FIG. 4, general explanations are made.

Generally, in optics the amount of defocus blur changes continuously with the distance of an object to a lens or a lens system. The measured value of the blur in an image of the object generated with such a lens or lens system can directly give the depth information, i.e. the distance of the object. Hence, the depth can be estimated by measuring the defocus blur of an image. Due to varying image features, measuring the absolute blur from a single image can be difficult in some cases. Therefore, two, for example in the case of the depth from defocus technique, or more, for example in the case of depth of focus technique, images are captured at different focus positions, and the depth is measured using the information of the blur (sharpness) difference between two images. As the optical blur varies across the field of view, the estimated depth from defocus also varies depending on the relative change in a blur. Additionally, the blur also changes with the orientation of image features, such as shown in FIG. 1 due to the known effect of astigmatism.

Figure 1A:
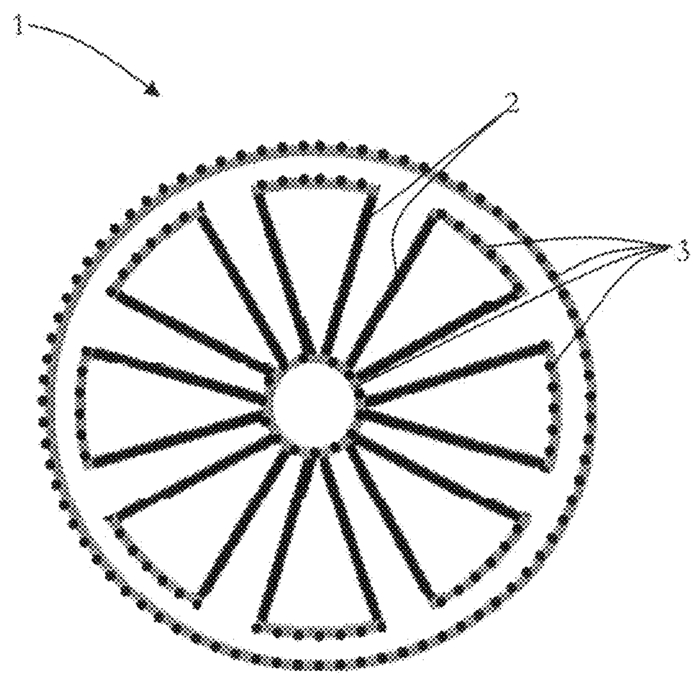
FIG. 1*a* illustrates an image having image features with sagittal and tangential orientation.
Figure 1B:
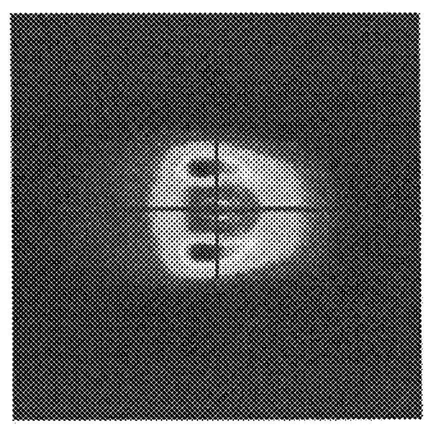
FIG. 1*b* illustrates a point spread function which simulates the effect of astigmatism.

FIG. 1*a* shows an image 1 with two general kinds of image features 2, 3 which each have an "edge". A first type of image features 2 has edges pointing in the direction of the center (black solid lines) called as sagittal orientation, and a second type of image features 3 has edges which are perpendicular to the sagittal orientation called as tangential orientation (gray color dotted lines). These two perpendicular planes, the sagittal and the tangential plane have different foci due to astigmatism in optics, which results into a different blur for the different orientations of the edges of the first 1 and second 2 type image features. The effect of astigmatism increases from the center of an image, such as image 1, to the outer field positions of the image.

Astigmatism of a lens can be simulated by a corresponding point spread function "PSF", which can be used in some embodiments for simulating the effect of astigmatism of a lens. An exemplary PSF is visualized in FIG. 1*b*. As can be taken form FIG. 1*b*, the PSF is not rotational symmetric which results into different blur amount in perpendicular directions.

In order to take these field varying aberrations into account, in some embodiments, the computed relative blur is a function of three variables, namely distance, orientation of the edge and location in the image.

In some embodiments, the change of blur can be specific for a particular lens system with which an image is produced. Hence, in such embodiments, the relative blur is also specific for the lens system with which the image is generated and, thus, the knowledge of the relative blur allows in some embodiments to correct a depth estimation for such images and thereby also allows, for example calibration of a lens system.

Since optical aberrations are rotational symmetric, it is assumed in some embodiments that the blur measure "BM", which is also referred to as "focus measure" herein, changes with the image height only, i.e. the change of the blur measure depends only on the distance to the center of the image. A focus measure, also referred to as blur measure, can be a value describing the sharpness of an image and can be determined by any known focus determination method, such as gradient, variance, phase detection or contrast detection or the like.

In some embodiments the relative blur is computed on the basis of normalized ratios between the individual blur measures:

$$C(\text{depth}, \theta, R) = \frac{BM_{image2} - BM_{image1}}{BM_{image2} + BM_{image1}} \quad (1)$$

where "$BM_i$" represents the amount of blur in each defocused image (image 1 and image 2); "θ" is the orientation of an edge of an image feature in the image at the position "R", and "R" is the distance from the center of the image.

The image may be divided into pixels and in such embodiments, the variable "R" is the distance of a pixel from the center of the image.

According to equation (1) the relative blur "C" is a function of three variables, namely "depth", "θ" and "R". In the following the terms "distance" and "depth" of an image are interchangeable in some embodiments, since the distance (basically) corresponds to the estimated depth and vice versa.

Hence, in some embodiments, the relative blur "C" is calculated for known values or predetermined values of distance ("depth"), edge orientation ("θ") and image height (R). These calculated and, thus, known relative blur values C(depth, θ, R) can be computed, for example, for some specific target scene of an image or the like, and they can be stored in a three dimensional lookup table ("LUT" hereinafter) defined for different distances ("depth"), edge orientation ("θ") and image height ("R"). In some embodiments, the LUT can be used to correct an estimated depth for any scene of an image captured with the same lens system which is used for calibration process.

Equation 1 is valid for one color images and it is equally valid for two color images which are defocused to different amount due to axial chromatic aberrations. As is known, chromatic aberration is a phenomenon in which different wavelengths of light (i.e. colors) focus at different distances from a lens due to dispersion in the lens.

For three defocused color images, which are based, for example, on red, green and blue (r, g, b), one possible way of modification to equation 1 is as follows, $$C(\text{depth}, \theta, R) = \frac{BM_r^2 - BM_b \times BM_g}{BM_r^2 + BM_b \times BM_g} \quad (2)$$

where $BM_r$ is the blur measure for, $BM_b$ is the blur measure for blue and $BM_g$ is the blur measure for green.

Generally, a color blur estimate BMc in local neighborhood M×N of an image I(x, y) with a color "c", such red "r", green "g" or blue "b", can be made on the basis of the following equation:

$$BM_c = \frac{\sum_{x=1}^{M}\sum_{y=1}^{N}[\Delta I_c(x, y)]^2}{\left[\max_{x=1}^{M}\max_{y=1}^{N} I(x, y) - \min_{x=1}^{M}\min_{y=1}^{N} I(x, y)\right]^T} \quad (3)$$

where $\Delta I_c(x,y)$ is the gradient of any color image $I_c$ in different directions. As described before, some other measures based on variance, contrast detection, etc. could also be used to measure the blur measure BM.

Generally, there also exist other methods for determining a depth or depth map from an image, such as the well known depth from defocus, which can also be applied in some embodiments for determining a depth from an image.

Due to different kinds of optical aberrations, the optical system is not rotational symmetric in all embodiments. In this case the LUT becomes four dimensional and it depends on "x" and "y", which are e.g. Cartesian coordinates instead of the pure image height "R":

$$C(\text{depth}, \theta, x, y) = \frac{BM_{image2} - BM_{image1}}{BM_{image2} + BM_{image1}} \quad (4)$$

Generally, in some embodiments, in order to interpolate between LUT values, the indices of the LUT values have to be derived from the estimated depth and image features, i.e. the edge orientation of the image feature of the associated estimated depth value has to be derived. This can be done in some embodiments with image gradients on the basis of which sagittal and tangential orientation of an edge of an image feature can be calculated from the following equation:

$$\theta(x, y) = \left\|\tan^{-1}\left(\frac{y}{x}\right) - \tan^{-1} * \left(\frac{g_y}{g_x}\right)\right| - 90\right| \quad (5)$$

where "x" and "y" are the image Cartesian coordinates and "$g_x$" and "$g_y$" are the image gradients in horizontal and vertical directions, respectively. It is generally known to calculate image gradients, e.g. with the aid of edge detection algorithms or the like. The computed value "θ", represents in some embodiments the edge orientation of an image feature in degrees with "θ=0" representing sagittal and "θ=90" representing tangential orientation.

Generally, in a process, such as a calibration process, for finding the relative depth values which can be used, for instance for calibrating a lens system and/or for correcting a depth map for an image, test images can be captured for different values of "θ", "R" and distance ("depth"). Using these test images and any suitable depth estimation method such as depth from chromatic aberration algorithm, discussed above in connection with equations (2) and (3), a three or four dimensional LUT can be created for the relative blur measures "C" for known values of "θ", "R" ("x", "y") and distance ("depth").

The above explained general principles can be used alone or in any combination in some embodiments, in particular in embodiments discussed in further detail below.

In some embodiments a method for determining field of view dependent depth map correction values for correction of a depth map of an image taken with a lens having a field of view, comprises obtaining relative depth information for at least two different depths and at least two different predetermined locations of the field of view of the lens.

An image might be a digital image in the embodiments and can be represented by computer data including pixels, and it might be in a digital data format, such as bitmap, jpeg, tiff or the like.

A depth map is an image containing several depth values for an image and it might be, like the image discussed, a digital depth map image in some embodiments and can be represented by computer data including pixels, and it might be in a digital data file format, such as bitmap, jpeg, tiff or the like.

The depth of the image can represent the distance of an object to the lens, in some embodiments.

The relative depth information can be obtained by applying e.g. equation 1, 2 and/or 4 discussed above to an image, e.g. taken with a lens and an image sensor, such as CCD sensor (charged coupled device) or CMOS sensor (complementary metal oxide semiconductor). The relative depth information can also be obtained by receiving it as computer data in a data file, e.g. over a network (local area network, internet, or the like) or on a data disk, flash drive or the like.

Hence, in some embodiments and as discussed above, the relative depth information depends at least on three variables, namely the distances ("depth"), edge orientation ("θ") and image height ("R") or, such as in the four dimension case, on the "x" and "y" coordinate of the image. In some embodiments, the "x" and "y" coordinate corresponds to a single pixel of an image, while in other embodiments it pertains, for example, to a pixel cluster having a predefined size and consisting out of a predefined number of pixels.

At next an image is received. In some embodiments, the image is taken with the lens and a sensor, as discussed above, or it is received as computer data in a data file, e.g. over a network (local area network, internet, or the like) or on a data disk, flash drive or the like, as already mentioned above.

A depth of the received image is determined and on the basis of the determined depth of the received image at least one depth map correction value is determined on the basis of the relative depth information.

As also discussed, the relative depth information "C" can be stored as relative depth values in a lookup table "LUT" and it depends in some embodiments on the distance ("depth"), edge orientation ("θ") and image height ("R") or, such as in the four dimension case, on the "x" and "y" coordinate of the image.

In order to identify the correct relative depth value from the relative depth information which can be used for correction, generally, the depth of the received image may be used. This corrects at least one relative depth values, thus, also called depth map correction value in this disclosure.

There exist several different embodiments which pertain to generating the relative depth information and/or for finding the at least one depth map correction value. Some of these embodiments are explained in the following.

In some embodiments, the obtaining of the relative depth information comprises obtaining a first focus measure and a second focus measure of a test image for at least a first and a second depth (distance). In some embodiments, multiple test images are taken at different distances of an object from the lens and for each one of the images a first and a second focus measure are obtained as discussed above in connections with equation (1). Of course, in some embodiments, three focus measures can be obtained, e.g. for red, blue and green as discussed in connection with equations (2) and (3). In some embodiments, wherein the conventional depth from defocus technique is employed, (at least) two test images are taken.

The obtained relative depth information can include multiple relative depth values "C", as discussed in connection with equations (2), (3) and (4) and which can be stored, for example in a lookup table.

As mentioned, in some embodiments, the blur, i.e. also the relative depth information can also depend on edge orientations of image features.

Hence, edge orientations for image features are determined at at least two different predetermined locations of the test image for the at least first and second depth (distance).

In some embodiments, the test image includes predetermined image features having a predetermined shape at the at least two different predetermined locations of the test image.

A test image might include typical predefined image features having, for example, different edges with different orientations. A test image, which can be used, without being limited to this specific example, is visualized in FIG. 2*a* and a reproduction of a digital image of the test image which is produced with real lens system is visualized in FIG. 2*b*.

The test image 10 has multiple crosses 11 at predefined locations in the test image 10. Each cross has two lines 11*a* and 11*b* having an identical edge line and which are perpendicular to each other, thereby each line 11*a* and 11*b* defines a sagittal and a tangential edge orientation for each cross 11, i.e. for each image feature. The test image 10 has 5 times 5 crosses which are equidistant distributed over image 11 and which are located on horizontal and vertical lines. The orientation of the crosses 11 varies such that crosses 11 which are in the center and on the central horizontal and vertical lines are upright, i.e. one line 11*a* is oriented in a vertical direction and the other line 11*b* is oriented in a horizontal direction, while crosses 11 distant from the center are rotated, e.g. over an angle of 45°.

The edge orientation of an image feature can be derived as explained above in connection with equation (5) in some embodiments. The edge orientation can also be known in advance and can be obtained e.g. as computer data associated with the test image.

At next relative depth values are determined on the basis of the first and the second focus measure of the test image and on the basis of the determined edge orientations at the at least two different predetermined locations of the test image, thereby relative depth information for the at least two different depths and at least two different locations of the field of view of the lens is obtained and may, as discussed, stored in a lookup table or the like.

As mentioned, in some embodiments multiple test images are taken at various distances. These multiple images can be taken, e.g. before the relative depth information is derived and/or the above-discussed process can be performed for each image subsequently.

As mentioned, in some embodiments the determination of an edge orientation of an image feature includes the determination of a sagittal and a tangential component of the edge orientation of the image feature.

In some embodiments, a depth map for the received image is generated and the depth map is corrected on the basis of at least one depth map correction value determined from the lookup table. In some embodiments, also edge orientations of image features of the received image at the at least two different predetermined locations of the test image are determined and the at least one depth map correction value is additionally determined on the basis of the determined edge orientations of image features.

As also discussed above, in some embodiments the correction of the depth map of the image may further comprise the calculation of at least one depth map correction value by interpolating between at least two relative depth map values stored in the lookup table. The interpolation can be performed, as it is known in the art, and can be based, for example, on a mean value between two or more values from the lookup table.

In order to perform this method previously described, multiple test images are required, e.g. for generating a lookup table with calibration/correction values.

In contrast to this, in some embodiments only one image is needed for finding correction values.

In some embodiments the relative depth information includes at least two relative depth curves, which represent relative depth values associated with different depths (distances). One curve, for example, is associated with a first predetermined location of the at least two different predetermined locations of the field of view of the lens and another is associated with a second predetermined location of the at least two different predetermined locations.

A depth curve can be determined on the basis of the determined depth of the received image. Thereby at least one depth map correction value is determined. The relative depth curves may be obtained on the basis of measurements of the lens and/or the relative depth curves may be calculated on the basis of information about the lens.

In other embodiments, the depth curves can also depend on sagittal and tangential components, as discussed above. In such embodiments, sagittal and tangential components of image features of the test image and the associated relative depth of the test image can be determined. In such embodiments, a depth curve can be additionally determined on the sagittal and/or tangential edge component.

Figure 3:
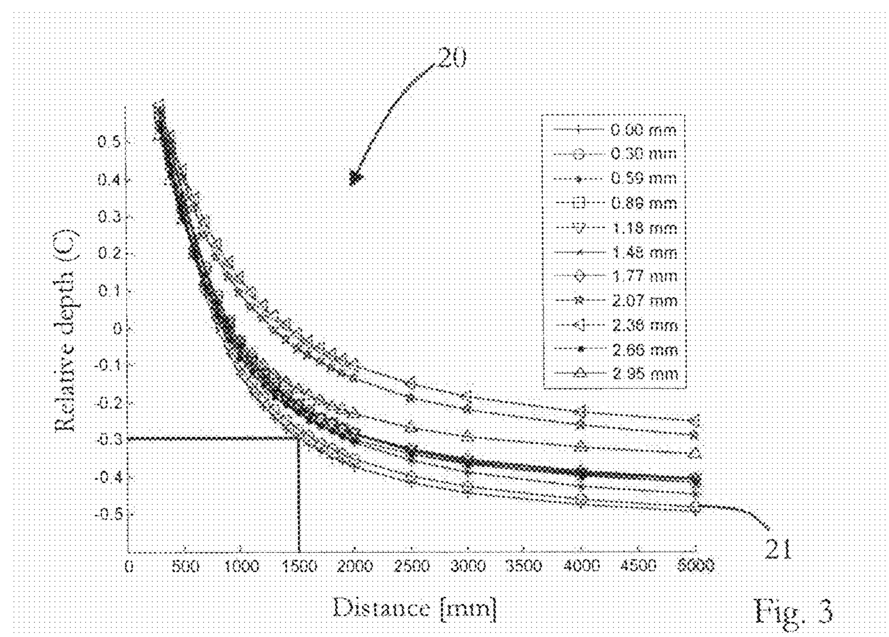
FIG. 3 shows a set of depth curves.

For an exemplary illustration of embodiments pertaining to depth curves, a set of depth curves 20 is exemplary illustrated in FIG. 3, without limiting the scope of the disclosure to these specific depth curves.

The set of depth curves 20 includes eleven relative depth curves. Each relative depth curve pertains to a different location of an image, as illustrated in the box in FIG. 3. Hence, each relative depth curves represents the change of relative depth versus distance (depth), measured at different image locations.

In some embodiments, as discussed above, only one single image, also referred to as test image or calibration image, is needed to identify one of the set of depth curves 20.

Such an image is taken or captured at some specific distance from the lens and it could be, e.g. a test image as explained above in connection with FIG. 2*a*.

In some embodiments it may be sufficient to obtain or receive one such image in order to predict the depth behavior at any image location.

When obtaining a set of measured and/or derived relative depth curves, one of them could be selected on the basis of the relative depth determined for an image received, such as a test image discussed in connection with FIG. 2*a* above.

For example, if the image is received, which is captured for example at a distance of 1500 mm to the lens, and the computed relative depth at any image location of the image is equal to −0.3, a respective relative depth curve can be identified, which includes this pair of values, i.e. a relative depth of zero at all image locations and captured at a distance of 1500 mm, as is visualized in FIG. 3 by the black line as curve 21 (curve represented by small circles). Thereby a corresponding relative depth curve can be determined and used for correction of a depth map of another image.

As discussed, the behavior of the relative depth curves must be established before, e.g. either through lens properties information or through real lens measurements.

The set of curves can be obtained, e.g. as digital data in some embodiments and can, as discussed generally for the images, received over a network/internet, etc.

The discussed method is simple, as only one image, i.e. test or calibration image, is used to determine an associated relative depth curve, such that e.g. all distances within a camera's field of view can be calibrated on the basis of one image.

In other embodiments, multiple depth map correction values are determined for the at least two different predetermined locations, as explained in the following. In such embodiments, the relative depth information may include multiple relative depth values, as explained above, and the relative depth information may be received in the form of a lookup table.

At first, coefficients of a mathematical function are calculated for the multiple depth map correction values associated with the at least two different predetermined locations. Thereby for each of the at least two different predetermined locations a set of coefficients is obtained, such that for each of the at least two different predetermined locations the mathematical function represents depth map correction values.

For instance, the following type of generic polynomial equation can be used for the purpose of fitting a curve through the depth map correction values:

$$p(x)=p_1x^n+p_2x^{n-1}+\dots+p_nx+p_{n+1} \tag{6}$$

where $p_i$, for i=1, 2, . . . n+1, represents the polynomial coefficients of the polynomial p(x). Furthermore, 'x' corresponds to the actual distance (depth), and p(x) represents polynomial of degree 'n' that fits the relative depth values of 'y'. One potential method of fitting could be least square minimization, which is well known, or other known fitting techniques may be used.

In some embodiments, edge orientations may be determined for image features at the at least two different predetermined locations. The multiple depth map correction values are additionally determined on the basis of the determined edge orientations for the image features.

In some embodiments, the determination of an edge orientation of an image feature includes the determination of a sagittal and a tangential component of the edge orientation of the image feature.

In some embodiments the above explained procedure of fitting a curve through the depth map correction values is repeated for the sagittal 'S' and tangential 'T' components of each field point, i.e. at each predetermined location, thereby a set coefficients is calculated for the sagittal and the tangential component at each predetermined location.

At this stage, multiple sets of coefficients are obtained defining polynomials, wherein each polynomial function represents a relative depth curve for different distances at a predetermined location, i.e. each polynomial function may represent one relative depth curve in some embodiments as explained above in connection with FIG. 3.

In order to find the polynomial function with the associated coefficients, in some embodiments, the following is performed:

A test image is received having image features at the at least two different predetermined locations. The test image may be a test image, as discussed above. The test image is obtained at a specific distance from the lens.

A depth is determined for the test image and edge orientations of the image features at the at least two different predetermined locations of the test image are determined.

Relative test image depth values are determined, e.g. with at least one of the methods discussed above, on the basis of the determined depth and the determined edge orientations.

Relative depth values are determined on the basis of the mathematical function and the calculated sets of coefficients as discussed and determined above in connection with equation (6).

The relative depth values y' can be calculated, for example, on the basis of:

$$y'=p_1x^n+p_2x^{n-1}+\ldots+p_nx+p_{n+1} \quad (7)$$

where pi, for i=1, 2, . . . n+1, again represents the polynomial coefficients which were stored in the method of this embodiment above, 'n' again represents the degree of the polynomial and 'x' again corresponds to a particular distance (depth) of the image, whereas y' corresponds to evaluated depth values at a particular distance.

The relative test image depth values, such as y', and the relative depth values, such as values "y" calculated with equation (6) above, and which are determined on the basis of the mathematical function, and the calculated set of coefficients are compared to each other. Thereby, a set of coefficients for the mathematical function representing depth map correction values is obtained.

For comparison error minimization methods can be used, such as the mean absolute error (MAE) method.

In some embodiments, on the basis of the comparison the best fitting polynomial coefficients are determined for sagittal "S" and tangential "T" components.

Some embodiments pertain to an apparatus which is configured to perform the above discussed methods at least partially. The apparatus can be, can comprise or can be comprised in a (video) camera, an optical lens system, an optical lens calibration system, a system for calibration of a lens, a depth estimation system, a computer, or the like.

In particular, an apparatus for determining field of view dependent depth map correction values for correction of a depth map of an image taken with a lens having a field of view comprises:

a lens, in particular an optical lens, wherein the lens can also include multiple lenses;

an image sensor, eg. a CCD or CMOS sensor as discussed above, for generating an image of an object in a predetermined distance from the lens; and a processor configured to:

obtain relative depth information for at least two different depths and at least two different predetermined locations of the field of view of the lens;

receive an image from the image sensor;

determine a depth of the received image; and determine on the basis of the determined depth of the received image at least one depth map correction value on the basis of the relative depth information.

The processor can be a microprocessor, a central processing unit, or the like.

In some embodiments, the processor is further configured to:

obtain a first focus measure and a second focus measure of a test image for at least a first and a second depth generated by the image sensor;

determine edge orientations for image features at at least two different predetermined locations of the test image for the at least first and second depth; and determining relative depth values on the basis of the first and the second focus measure of the test image and on the basis of the determined edge orientations at the at least two different predetermined locations of the test image, thereby obtaining relative depth information for the at least two different depths and at least two different locations of the field of view of the lens.

In some embodiments, the relative depth information includes at least two relative depth curves representing relative depth values associated with different depths for at least two different predetermined locations of the field of view of the lens. The processor can be further configured to determine a depth curve on the basis of the determined depth of the received image, thereby determining at least one depth map correction value.

In some embodiments, the multiple depth map correction values are determined for the at least two different predetermined locations. The processor can be further configured to calculate coefficients of a mathematical function for the multiple depth map correction values associated with the at least two different predetermined locations, thereby obtaining for each of the at least two different predetermined locations a set of coefficients, such that for each of the at least two different predetermined locations the mathematical function represents depth map correction values.

Returning to FIG. 4, a method 30 for determining field of view dependent depth map correction values for correction of a depth map of an image taken with a lens having a field of view is illustrated.

At 31 relative depth information for at least two different depths and at least two different predetermined locations of the field of view of the lens is obtained. As discussed above, the relative depth information can be obtained, for example, by applying equation (1) discussed above. The relative depth information depends on the depth, the image height and an edge orientation, i.e. on a sagittal and tangential component, as discussed above.

An image is received at 32 and a depth of the received image is determined at 33. As discussed, the depth can be obtained via known methods and/or via the depth from chromatic aberration algorithm discussed above.

At 34 at least one depth map correction value is determined on the basis of the determined depth of the received image and on the basis of the relative depth information, as also already discussed above.

Figure 5:
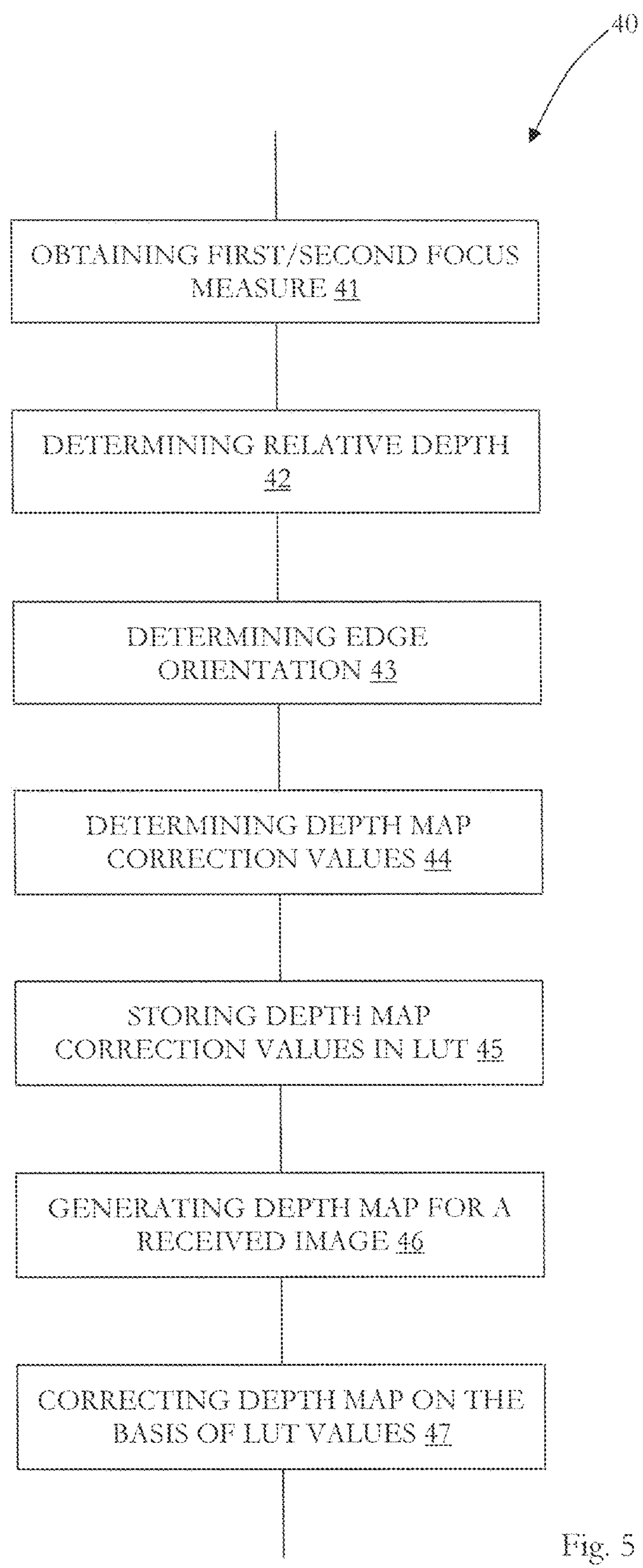
FIG. 5 is a further flow chart of a method of the disclosure.

A method 40 which can be performed alone or in combination with the method of FIG. 4 is illustrated in FIG. 5. The method is explained in connection with the test image 10 as illustrated in FIG. 2*a*. Of course, other test images can be used and the present disclosure is not limited to the specific test image 10.

The relative depth information which is used for correcting a depth map is determined as follows.

At 41 a first focus measure and a second focus measure of a test image for at least a first and a second depth is obtained. The test image, such as test image 10 shown in FIG. 2*a*, has predetermined image features having a predetermined shape, namely 5 times 5 crosses 11, as discussed above, which are located at predetermined locations at the test image 10. Each cross 11 has two edges 11*a* and 11*b*, which have sagittal and a tangential orientation, respectively, as explained in detail above in connection with FIG. 2*a*.

With the test image 10 a series of (digital) test images can be produced, e.g. with a lens systems and a sensor, as discussed (see FIG. 2*b* for a "real image"), which is performed before the obtaining of the first/second focus at 41. The test images are produced at different object distances, i.e. distances between test image 10 and the lens, and object size is changed, e.g. by changing the distance between the test image, such as test image 10, and a lens or lens system.

For each of the thereby produced test images the first and second focus measure is obtained (e.g. equation (1)) at 41.

At 42, for each test image, a relative depth is estimated e.g. using the depth from chromatic aberration algorithm (DfCA) discussed in connection with equations (2) and (3). At 43, the edge orientation of the image features, i.e. crosses 11, at each location is determined by computing the sagittal (S) and tangential (T) edge components, e.g. with the aid of equation (5). Then the relative depth values for them are determined.

Then median values of the sagittal (S) and tangential (T) components, i.e. for the local neighborhood relative depth values associated with the sagittal and tangential components, can be calculated at each position of a cross 11. For this calculation median values are taken for the local neighborhood of each cross 11, i.e. one median value is calculated for all the relative depth values corresponding to, for example, edge 11*a* of one cross 11 and a second median value is calculated for the other 11*b* of the cross 11 in question. In this way two median values are obtained at each cross position, each representing the sagittal (S) and tangential (T) component. In other embodiments, mean values instead of median values can also be used, but in some embodiments median values can remove a large relative depth error which occurs less in the neighborhood.

At 44 the relative depth values associated with the median sagittal and tangential components are determined and stored as depth correction values for each image in a LUT at 45.

For correction of a specific depth map of a received image, the following can be additionally performed.

A depth map for the received image is generated at 46 and the depth map is corrected at 47 on the basis of at least one depth map correction value determined from the lookup table generated at 45.

Additionally, the generation of the depth map at 46 may include determining edge orientations of image features of the received image at the at least two different predetermined locations of the test image. In this case the at least one depth map correction value is additionally determined on the basis of the determined edge orientations of image features from the lookup table.

As discussed above, the correction of the depth map may further include calculating at least one depth map correction value by interpolating between at least two relative depth map values stored in the lookup table.

The above described method, in particular steps 41 to 45 may be repeated in some embodiments for any calibration of any new lens or lens system, such that also the step of generating multiple test images is to be repeated.

Figure 6:
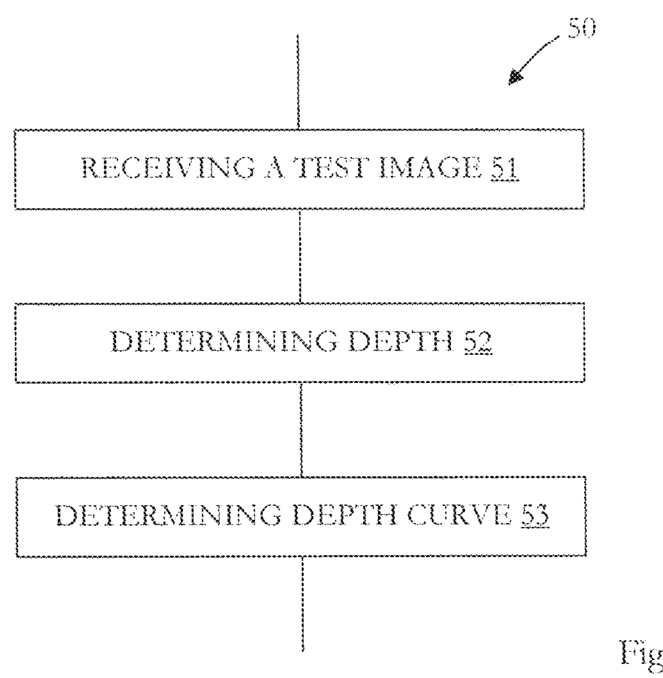
FIG. 6 is a further flow chart of a method of the disclosure.

FIG. 6 illustrates a method 50 where only one image is needed for finding correction values. The method 50 may be performed together with the method of FIG. 4 or it may be performed alone. The method 50 is also explained on the basis of the set of relative depth curves as shown in FIG. 3 and as also explained in detail above.

The relative depth information includes at least two relative depth curves or set of relative depth curves, which represent relative depth values associated with different depths (distances). One curve, for example, is associated with a first predetermined location of the at least two different predetermined locations of the field of view of the lens and another is associated with a second predetermined location of the at least two different predetermined locations.

At 51 a test image is received for which a depth curve for correction should be determined. The test image can be, for example, a test image 10 as discussed in connection with FIG. 2*a*. The test image is generated at a specific distance of a lens.

At 52 a relative depth is determined for the test image, e.g. on the basis of equation (1) or on the basis of the DfCA explained in connection with equations (2) and (3).

A depth curve out of the set curves is determined at 53 on the basis of the determined depth of the received test image. For instance, as discussed above, in the case that the distance is 1500 mm and the relative depth is −0.3, the depth curve 21 represented by circles of FIG. 3 and where the black lines cross each other is determined.

As the depth curve represents multiple relative depth values for multiple distance, the relative depth values can be used for correction of a depth map of another image, which is taken at a certain distance.

Figure 7:
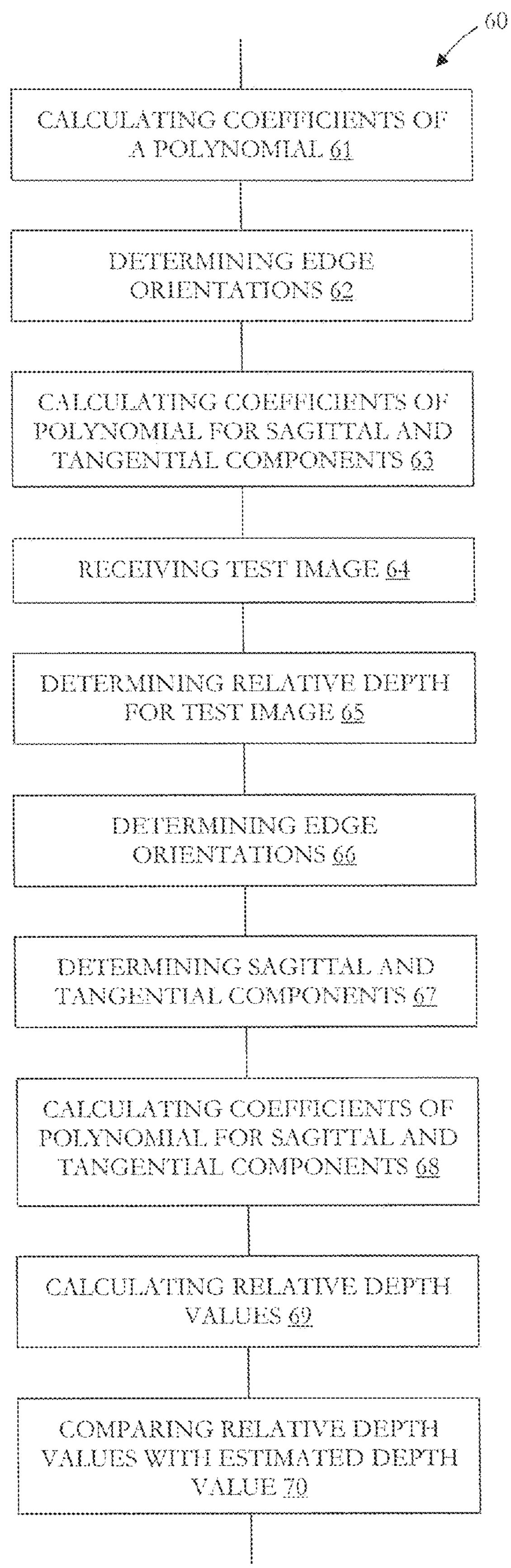
FIG. 7 is a further flow chart of a method of the disclosure.

FIG. 7 shows a method 60, which can be performed alone or in connection with the method 30 of FIG. 4, wherein multiple depth map correction values are determined for the at least two different predetermined locations. The multiple depth map correction values can be determined, for example, with the method as discussed in connection of FIG. 5 above and they can be received, for example, in the form of the lookup table.

At 61 coefficients of a mathematical function are calculated for the multiple depth map correction values associated with the at least two different predetermined locations. Thereby for each of the at least two different predetermined locations a set of coefficients is obtained, such that for each of the at least two different predetermined locations the mathematical function represents depth map correction values.

Without limiting the scope of the disclosure to a specific mathematical function, in the following method 60 is explained for a polynomial, which is used of a curve fitting to the depth map correction values of the LUT:

$$p(x)=p_1x^n+p_2x^{n-1}+ \ldots +p_nx+p_{n+1}$$

where $p_i$, for i=1, 2, . . . n+1, represents the polynomial coefficients of the polynomial p(x). Furthermore, 'x' corresponds to the actual distance, and p(x) represents polynomial of degree 'n' that fits the relative depth values of the LUT table, such that the result 'y' is in the form of a depth curve, such as exemplary shown in FIG. 3 and as discussed above. Moreover, in the following, without limiting the scope of the disclosure, the method 60 is explained exemplary for the test image 10 as shown in FIG. 2*a* and as discussed above, which has 5 times 5, i.e. 25 crosses 11 as image features, such that test image 10 has 5×5 locations or field points.

One potential method of fitting could be least square minimization, as discussed above.

At 62 edge orientations for image features at the at least two different predetermined locations are determined from the LUT and the multiple depth map correction values are additionally determined on the basis of the determined edge orientations for the image features, i.e. sagittal "S" and tangential "T" components of the depth values of the LUT are determined.

At 63 the same procedure of this polynomial curve fitting is repeated for the sagittal "S" and tangential "T" components of each of the 25 field points.

Figure 2A:
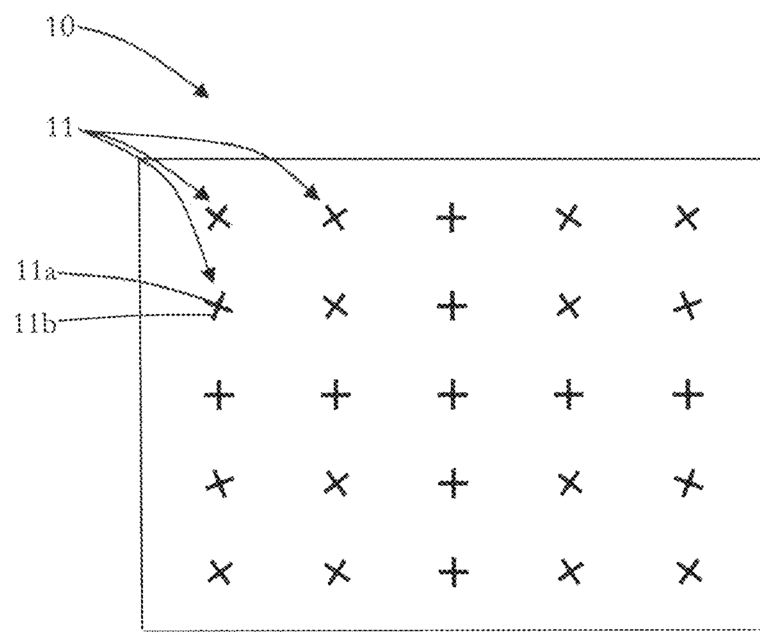
FIG. 2*a* shows an exemplary test image.
Figure 2B:
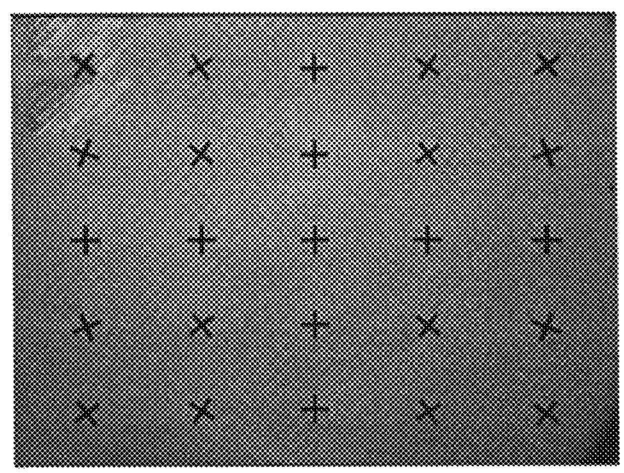
FIG. 2*b* shows a real captured of the test image of FIG. 2*a;*

Hence, assuming that the LUT was produced for the test image as shown in FIG. 2*a*, then the polynomial fitting is applied for all 5×5 field points, i.e. crosses 11, and for each "S" and "T" component, and therefore, 50 sets of polynomial coefficients are stored in memory for later use.

At this stage, the method 60 provides a set of (50) polynomial coefficients which can be used in the following step, e.g. for calibration of a lens or the like.

At 64 a test image, such as test image 10, is received which has image features at the at least two different predetermined locations, i.e. 25 crosses 11 at 25 locations in the present case.

The test image can be a single image and can be captured at a particular object distance and size.

At 65, for this single test image first the relative depth is estimated using e.g. DfCA discussed above. At 66, edge orientations, i.e. sagittal and tangential orientations, are determined at each field point, i.e. at each cross 11.

At 67, relative test image depth values are determined on the basis of the determined depth and the determined edge orientations, i.e. sagittal "S" and tangential "T" edge components are computed for the test image followed by calculation of median values of S and T components at each cross position.

At 68 the best fitting polynomial coefficients are searched that are subsequently used to derive correction values. The generic polynomial evaluation equation which is used for fitting the polynomial coefficients is as follows:

$$y'=p_1x^n+p_2x^{n-1}+ \dots +p_nx+p_{+1}$$

where $p_i$, for i=1, 2, . . . n+1, represents the (50) polynomial coefficients that have been stored above, 'n' again represents the degree of the polynomial and 'x' again corresponds to a particular distance. Whereas, y' corresponding to an evaluated depth value at a particular distance is calculated at 69. The calculated depth value y' is compared at 70 with the estimated depth value or 'y' at distance 'x' calculated above. As mentioned above, a potential comparison method is the mean absolute error method. The comparison gives the best fitting polynomial coefficients which are selected for the "S" and "T" components.

Referring to the above example of test image 10 this means that 50 sets of polynomial coefficients are used to obtain 50 y' values at a particular distance 'x', and as a result of the comparison, finally the polynomial coefficients are selected that corresponds to the minimum mean absolute error between estimated 'y' value and the 50 y' values.

In this embodiment, for calibration of any new lens only the steps 64 to 70 have to be repeated, i.e. a new test image has to be taken and the best set of polynomial coefficients has to be determined, as explained above.

FIG. 8 illustrates an apparatus 80 for determining field of view dependent depth map correction values for correction of a depth map of an image taken with a lens 82 having a field of view. The apparatus 80 has an optical lens 82. The lens 82 can include multiple lenses and, thus, it can form a lens system in some embodiments.

Behind the lens 82, an image sensor 83 for generating an image of an object 81 in a predetermined distance from the lens 82 is provided. The image sensor 83 can be, as discussed above, a CCD or CMOS sensor or another type of image sensor. The object 81 can be formed, for example by a test image, such as test image 10 explained above, for calibration of the apparatus 80. After calibration of the apparatus 80, the object 81 can be any object for which a depth should be estimated.

Apparatus 80 also has processor, namely a CPU 84, which is connected to the image sensor 83 and which is configured to perform any one of the methods discussed above, such as method 30 of FIG. 4, method 40 of FIG. 5, method 50 of FIG. 6 and method 60 of FIG. 7.

Additionally, apparatus 80 can have a memory 85 for storing depth values, image data, lookup tables, and computer program code which causes the CPU 84 to perform anyone of the methods discussed above at least partially, etc.

The memory 85 can include volatile and/or non-volatile memory, e.g. RAM, NRAM, flash RAM, hard disk, compact disk, etc.

Apparatus 80 can also have an interface 86, which can include a user interface, such that a user can make inputs. A user interface can be for example include a pointer device, a keyboard, a graphic tablet, a touchscreen and so on.

Moreover, the interface 86 can provide an interface to a network, such as a local area network or internet or the like, for sending and/or receiving digital data, such as image data, depth value data, lookup table data etc.

In some embodiments, the interface 86 can also include a graphical interface which is connected to a display, e.g. for displaying image data or the like.

As mentioned above, apparatus 80 can be, can comprise or can be comprised in, e.g.: a digital camera, lens calibration system, video camera, personal computer, mobile telephone, tablet computer, handheld computer, etc.

FIGS. 9*a* to 9*d* illustrate the effect of a depth map correction as described above. A target image (e.g. test image 10, FIG. 2*a*) was at a fixed distance from the camera. As discussed, the target image 10 shown in FIG. 2*a* is created such that there is always a sagittal and tangential edge orientation present at different image locations covering the complete field of view. FIG. 9*a* shows a depth computed from the real captured image shown in FIG. 2*b* by any suitable depth estimation method such as depth from chromatic aberration (DfCA) algorithm discussed. The depth map of FIG. 9*a* shows that the estimated depth values are not consistent with the image position and orientation of the edges, since the depth values vary for different crosses. In contrast to this, FIG. 9*b* shows a depth map after field and edge orientation dependent depth correction using the calibrated LUT discussed above. The depth values are more consistent across the field of view and the depth value variation is smaller as can be taken from a comparison from the enlarged central crosses of the uncorrected depth map, see FIG. 9*c*, and the corrected depth map, see FIG. 9*d*.

Note that the present technology can also be configured as described below.

(1) A method for determining field of view dependent depth map correction values for correction of a depth map of an image taken with a lens having a field of view, comprising:

obtaining relative depth information for at least two different depths and at least two different predetermined locations of the field of view of the lens;

receiving an image;

determining a depth of the received image; and determining on the basis of the determined depth of the received image at least one depth map correction value on the basis of the relative depth information.

(2) The method of (1), wherein obtaining of the relative depth information comprises:

obtaining a first focus measure and a second focus measure of a test image for at least a first and a second depth;

determining edge orientations for image features at at least two different predetermined locations of the test image for the at least first and second depth; and determining relative depth values on the basis of the first and the second focus measure of the test image and on the basis of the determined edge orientations at the at least two different predetermined locations of the test image, thereby obtaining relative depth information for the at least two different depths and at least two different locations of the field of view of the lens.

(3) The method of (2), wherein the determination of an edge orientation of an image feature includes the determination of a sagittal and a tangential component of the edge orientation of the image feature.

(4) The method of (2) or (3), wherein the determined relative depth values are stored in a lookup table.

(5) The method of (4), further comprising generating a depth map for the received image and correcting the depth map on the basis of at least one depth map correction value determined from the lookup table.

(6) The method of anyone of (2) to (5), further comprising determining edge orientations of image features of the received image at the at least two different predetermined locations of the test image and wherein the at least one depth map correction value is additionally determined on the basis of the determined edge orientations of image features.

(7) The method of anyone of (2) to (6), wherein the correction of the depth map further comprises calculating at least one depth map correction value by interpolating between at least two relative depth map values stored in the lookup table.

(8) The method of anyone of (2) to (7), wherein the test image includes predetermined image features having a predetermined shape at the at least two different predetermined locations of the test image.

(9) The method of (1), wherein the relative depth information includes at least two relative depth curves representing relative depth values associated with different depths for at least two different predetermined locations of the field of view of the lens.

(10) The method of claim (9), wherein a depth curve is determined on the basis of the determined depth of the received image, thereby determining at least one depth map correction value.

(11) The method of (9) or (10), wherein the relative depth curves are obtained on the basis of measurements of the lens.

(12) The method of anyone of (9) to (11), wherein the relative depth curves are calculated on the basis of information about the lens.

(13) The method of (1), wherein multiple depth map correction values are determined for the at least two different predetermined locations:

calculating coefficients of a mathematical function for the multiple depth map correction values associated with the at least two different predetermined locations, thereby obtaining for each of the at least two different predetermined locations a set of coefficients, such that for each of the at least two different predetermined locations the mathematical function represents depth map correction values.

(14) The method of (13), further comprising:

determining edge orientations for image features at the at least two different predetermined locations, and wherein the multiple depth map correction values are additionally determined on the basis of the determined edge orientations for the image features.

(15) The method of (14), wherein the determination of an edge orientation of an image feature includes the determination of a sagittal and a tangential component of the edge orientation of the image feature.

(16) The method of (14) or (15), further comprising:

receiving a test image having image features at the at least two different predetermined locations;

determining a depth for the test image;

determining edge orientations of the image features at the at least two different predetermined locations of the test image;

determining relative test image depth values on the basis of the determined depth and the determined edge orientations;

determining relative depth values on the basis of the mathematical function and the calculated sets of coefficients;

comparing the relative test image depth values and the relative depth values determined on the basis of the mathematical function and the calculated set of coefficients, thereby obtaining a set of coefficients for the mathematical function representing depth map correction values.

(17) An apparatus for determining field of view dependent depth map correction values for correction of a depth map of an image taken with a lens having a field of view, comprising:

a lens;

an image sensor for generating an image of an object in a predetermined distance from the lens; and a processor configured to:

obtain relative depth information for at least two different depths and at least two different predetermined locations of the field of view of the lens;

receive an image from the image sensor;

determine a depth of the received image; and determine on the basis of the determined depth of the received image at least one depth map correction value on the basis of the relative depth information.

(18) The apparatus of (17), wherein the processor is further configured to:

obtain a first focus measure and a second focus measure of a test image for at least a first and a second depth generated by the image sensor;

determine edge orientations for image features at at least two different predetermined locations of the test image for the at least first and second depth; and determining relative depth values on the basis of the first and the second focus measure of the test image and on the basis of the determined edge orientations at the at least two different predetermined locations of the test image, thereby obtaining relative depth information for the at least two different depths and at least two different locations of the field of view of the lens.

(19) The apparatus of (17), wherein the relative depth information includes at least two relative depth curves representing relative depth values associated with different depths for at least two different predetermined locations of the field of view of the lens and wherein the processor is further configured to determine a depth curve on the basis of the determined depth of the received image, thereby determining at least one depth map correction value.

(20) The apparatus of claim (17), wherein multiple depth map correction values are determined for the at least two different predetermined locations and wherein the processor is further configured to calculate coefficients of a mathematical function for the multiple depth map correction values associated with the at least two different predetermined locations, there-by obtaining for each of the at least two different predetermined locations a set of coefficients, such that for each of the at least two different predetermined locations the mathematical function represents depth map correction values.

(21) An apparatus for determining field of view dependent depth map correction values for correction of a depth map of an image taken with a lens having a field of view, comprising:

a lens;

an image sensor for generating an image of an object in a predetermined distance from the lens; and a processor configured to perform anyone of the methods of (1) to (16).

(22) A computer program comprising program code causing a computer to perform the method according to anyone of (1) to (16), when being carried out on a computer.

(23) A non-transitory computer-readable recording medium that stores therein a computer program product, which, when executed by a processor, causes the method according to anyone of (1) to (16) to be performed.

The present application claims priority to European Patent Application 13 187 969.4, filed in the European Patent Office on Oct. 9, 2013 the entire contents of which being incorporated herein by reference.

The invention claimed is:

1. A method for determining field of view dependent depth map correction values for correction of a depth map of an image taken with a lens having a field of view, comprising:

obtaining a first focus measure and a second focus measure of a test image for at least a first and a second depth;

determining edge orientations for image features at at least two different predetermined locations of the test image for the at least first and second depth;

obtaining relative depth information for at least two different depths and at least two different predetermined locations of the field of view of the lens on the basis of the first and the second focus measure of the test image and on the basis of the determined edge orientations at the at least two different predetermined locations of the test image;

receiving an image;

determining a depth of the received image; and determining on the basis of the determined depth of the received image at least one depth map correction value on the basis of the relative depth information.

2. The method of claim 1, wherein obtaining of the relative depth information comprises:

determining relative depth values on the basis of the first and the second focus measure of the test image and on the basis of the determined edge orientations at the at least two different predetermined locations of the test image, thereby obtaining relative depth information for the at least two different depths and at least two different locations of the field of view of the lens.

3. The method of claim 1, wherein the determination of an edge orientation of an image feature includes the determination of a sagittal and a tangential component of the edge orientation of the image feature.

4. The method of claim 2, wherein the determined relative depth values are stored in a lookup table.

5. The method of claim 4, further comprising generating a depth map for the received image and correcting the depth map on the basis of at least one depth map correction value determined from the lookup table.

6. The method of claim 5, further comprising determining edge orientations of image features of the received image at the at least two different predetermined locations of the test image and wherein the at least one depth map correction value is additionally determined on the basis of the determined edge orientations of image features.

7. The method of claim 6, wherein the correction of the depth map further comprises calculating at least one depth map correction value by interpolating between at least two relative depth map values stored in the lookup table.

8. The method of claim 1, wherein the test image includes predetermined image features having a predetermined shape at the at least two different predetermined locations of the test image.

9. A method for determining field of view dependent depth map correction values for correction of a depth map of an image taken with a lens having a field of view, comprising: obtaining relative depth information for at least two different depths and at least two different predetermined locations of the field of view of the lens, wherein the relative depth information includes at least two relative depth curves representing relative depth values associated with different depths for at least two different predetermined locations of the field of view of the lens;

receiving an image;

determining a depth of the received image; and determining on the basis of the determined depth of the received image at least one depth map correction value on the basis of the relative depth information.

10. The method of claim 9, wherein a depth curve is determined on the basis of the determined depth of the received image, thereby determining at least one depth map correction value.

11. The method of claim 9, wherein the relative depth curves are obtained on the basis of measurements of the lens.

12. The method of claim 9, wherein the relative depth curves are calculated on the basis of information about the lens.

13. A method for determining field of view dependent depth map correction values for correction of a depth map of an image taken with a lens having a field of view, further comprising:

obtaining relative depth information for at least two different depths and at least two different predetermined locations of the field of view of the lens;

receiving an image;

determining a depth of the received image;

determining edge orientations for image features at the at least two different predetermined locations;

determining on the basis of the determined depth of the received image at least one depth map correction value on the basis of the relative depth information, wherein multiple depth map correction values are determined for the at least two different predetermined locations, wherein the multiple depth map correction values are determined for the at least two different predetermined locations on the basis of the determined edge orientations for the image features; and calculating coefficients of a mathematical function for the multiple depth map correction values associated with the at least two different predetermined locations, thereby obtaining for each of the at least two different predetermined locations a set of coefficients, such that for each of the at least two different predetermined locations the mathematical function represents depth map correction values.

14. The method of claim 13, wherein the determination of an edge orientation of an image feature includes the determination of a sagittal and a tangential component of the edge orientation of the image feature.

15. The method of claim 13, further comprising:

receiving a test image having image features at the at least two different predetermined locations;

determining a depth for the test image;

determining edge orientations of the image features at the at least two different predetermined locations of the test image;

determining relative test image depth values on the basis of the determined depth and the determined edge orientations;

determining relative depth values on the basis of the mathematical function and the calculated sets of coefficients;

comparing the relative test image depth values and the relative depth values determined on the basis of the mathematical function and the calculated set of coefficients, thereby obtaining a set of coefficients for the mathematical function representing depth map correction values.

16. An apparatus comprising:

a processor configured to:

obtain a first focus measure and a second focus measure of a test image for at least a first and a second depth;

determine edge orientations for image features at at least two different predetermined locations of the test image for the at least first and second depth;

obtain relative depth information for at least two different depths and at least two different predetermined locations of a field of view of a lens on the basis of the first and the second focus measure of the test image and on the basis of the determined edge orientations at the at least two different predetermined locations of the test image;

receive an image from an image sensor;

determine a depth of the received image; and determine on the basis of the determined depth of the received image at least one depth map correction value on the basis of the relative depth information.

17. The apparatus of claim 16, wherein the processor is further configured to:

determining relative depth values on the basis of the first and the second focus measure of the test image and on the basis of the determined edge orientations at the at least two different predetermined locations of the test image, thereby obtaining relative depth information for the at least two different depths and at least two different locations of the field of view of the lens.

18. An apparatus comprising:

a processor configured to:

obtain relative depth information for at least two different depths and at least two different predetermined locations of a field of view of a lens, wherein the relative depth information includes at least two relative depth curves representing relative depth values associated with different depths for at least two different predetermined locations of the field of view of the lens;

receive an image from an image sensor;

determine a depth of the received image; and determine on the basis of the determined depth of the received image at least one depth map correction value on the basis of the relative depth information.

19. The apparatus of claim 16, wherein multiple depth map correction values are determined for the at least two different predetermined locations and wherein the processor is further configured to calculate coefficients of a mathematical function for the multiple depth map correction values associated with the at least two different predetermined locations, thereby obtaining for each of the at least two different predetermined locations a set of coefficients, such that for each of the at least two different predetermined locations the mathematical function represents depth map correction values.

20. The apparatus of claim 16, further comprising:

the lens; and the image sensor.

* * * * *